United States Patent [19]

Prenat

[11] Patent Number: 5,049,888
[45] Date of Patent: Sep. 17, 1991

[54] METHOD FOR INSTANTANEOUS PROCESSING OF THE GLINT NOISE AND TRACKING MONOPULSE RADAR RECEIVER CARRYING OUT THIS METHOD

[75] Inventor: Michel Prenat, Boulogne, France
[73] Assignee: Thomson CSF, Paris, France
[21] Appl. No.: 562,186
[22] Filed: Dec. 15, 1983

[30] Foreign Application Priority Data

Dec. 30, 1982 [FR] France .................. 82 22087

[51] Int. Cl.$^5$ ............................................. G01S 13/44
[52] U.S. Cl. ................................................. 342/149
[58] Field of Search ..................... 343/16 M; 342/149

[56] References Cited

U.S. PATENT DOCUMENTS

| 4,296,415 | 10/1981 | Pelton et al. | 342/149 |
| 4,345,252 | 8/1982 | Carre et al. | 342/195 |
| 4,368,468 | 1/1983 | Lisle et al. | 342/149 |
| 4,719,464 | 1/1988 | Gendreu | 342/149 |

Primary Examiner—Gilberto Barrón, Jr.
Attorney, Agent, or Firm—Cushman, Darby & Cushman

[57] ABSTRACT

Method and apparatus for instantaneous processing of the glint noise in a monopulse radar. The radar antenna receives a sum signal $\bar{S}$ and a difference signal $\Delta$ whose phases vary as functions of time. Successive derivatives $Q^{(k)}$ of order k, are calculated as a function of time from $k=0$ to $k=N'$. Also, the scaler product $Q=\bar{S}\times\Delta$ of the sum signal and difference signals is calculated. Then, successive derivatives $P^{(k)}$ of order k are calculated as a function of time from $k=0$ up to $k=N'$. Also, the power $P=|\bar{S}|^2$ of the signal received, which is equal to the square of the modulus of the sum signal $\bar{S}$, is calculated. Next, a plurality of derived angle-error measurement operators ($\epsilon_k$) are calculated such that a $\epsilon_k=Q^{(k)}/P^{(k)}$. Finally, a combined angle-error measurement operator $\epsilon$ is calculated such that $$\epsilon = \frac{\sum_{k=0}^{N'} \beta_k \cdot \epsilon_k}{\sum_{k=0}^{N'} \beta_k}$$

The weighting coefficients $\beta_k$ are coefficients representing the quality of the associated derived operator $\epsilon_k$ relative to the angle-error measurement of the barycenter of the target.

12 Claims, 8 Drawing Sheets

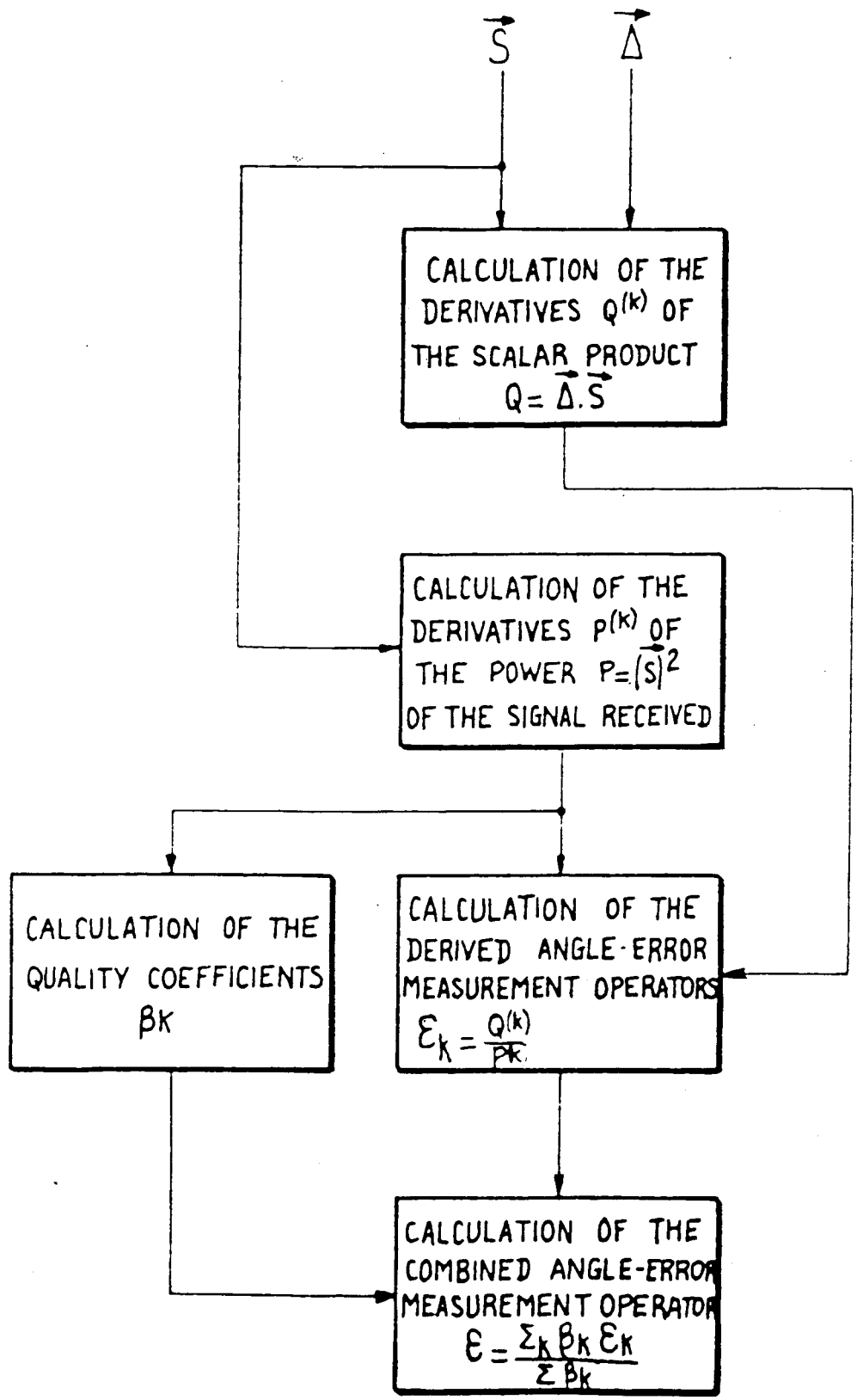
FIG_1

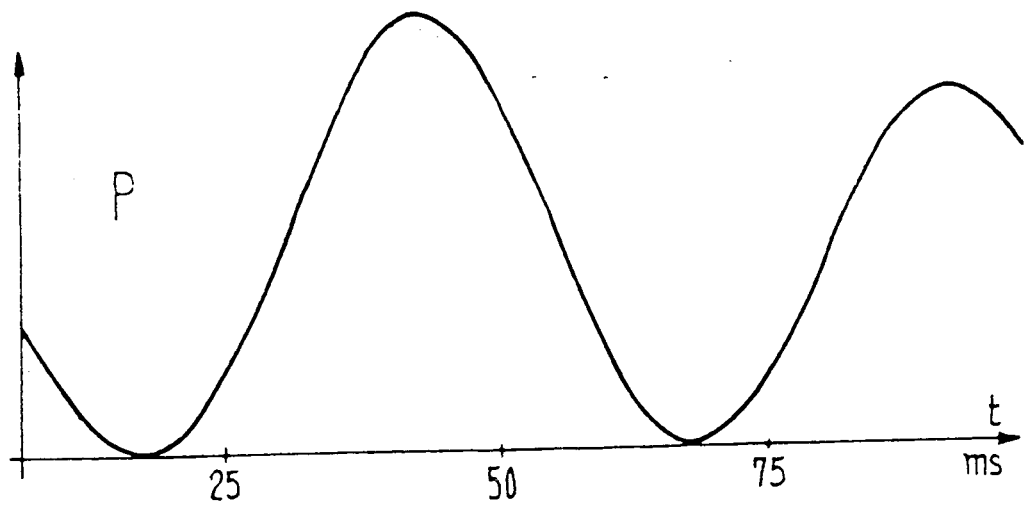
FIG_2-a
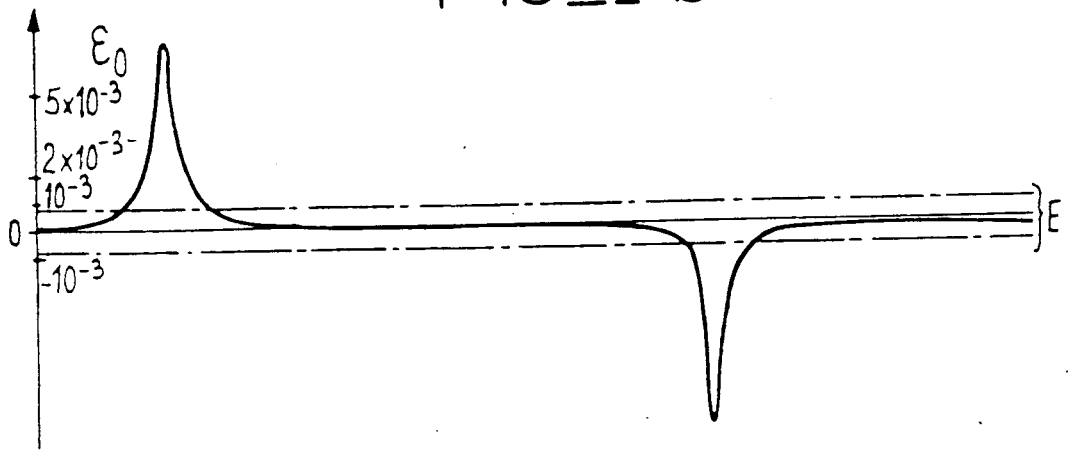
FIG_2-b
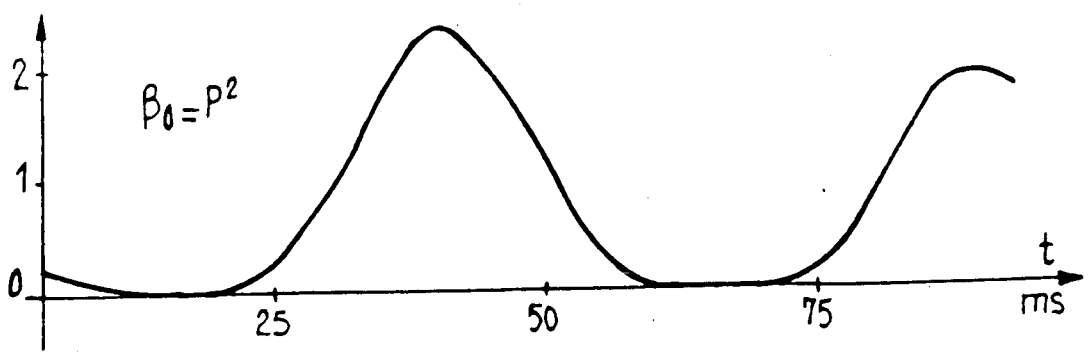
FIG_2-c

FIG_3-a
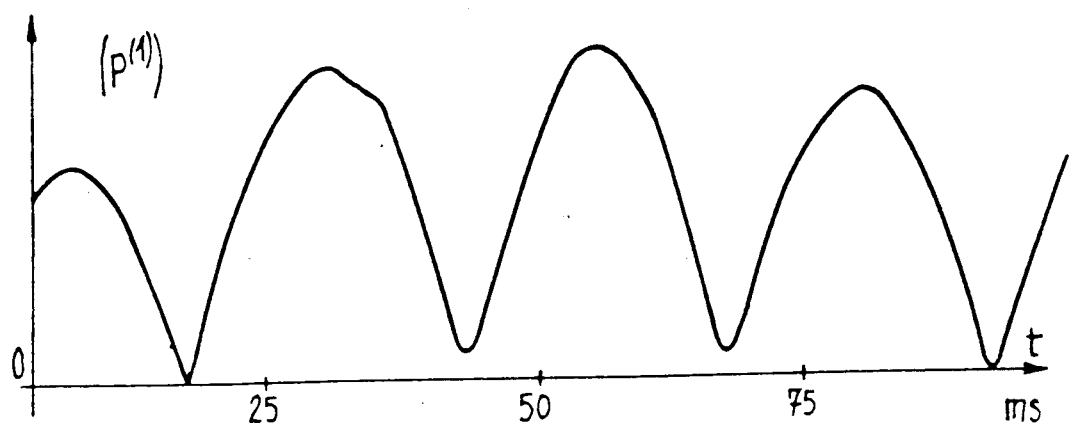
FIG_3-b
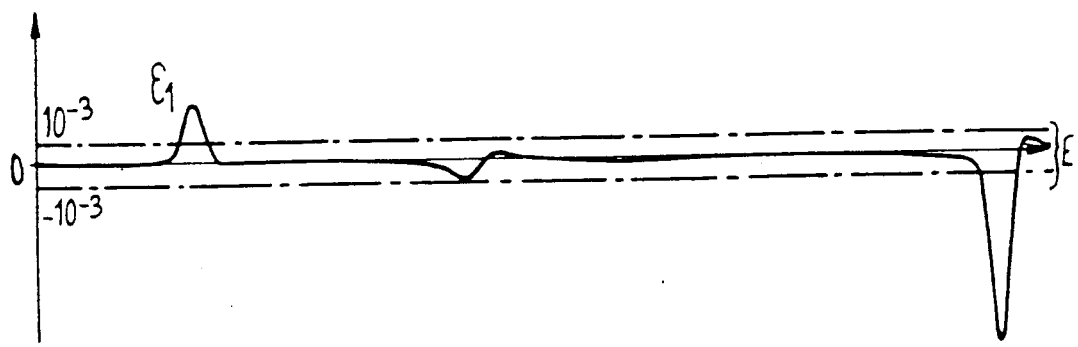
FIG_3-c
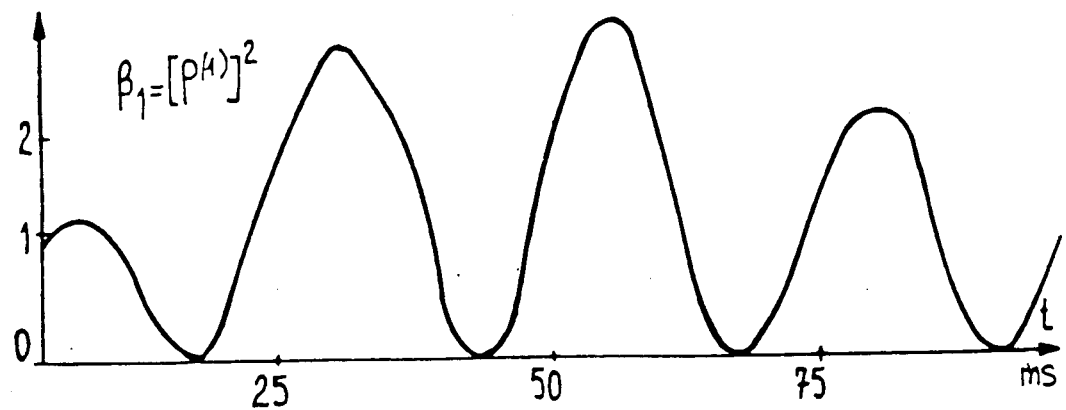

FIG_4-a
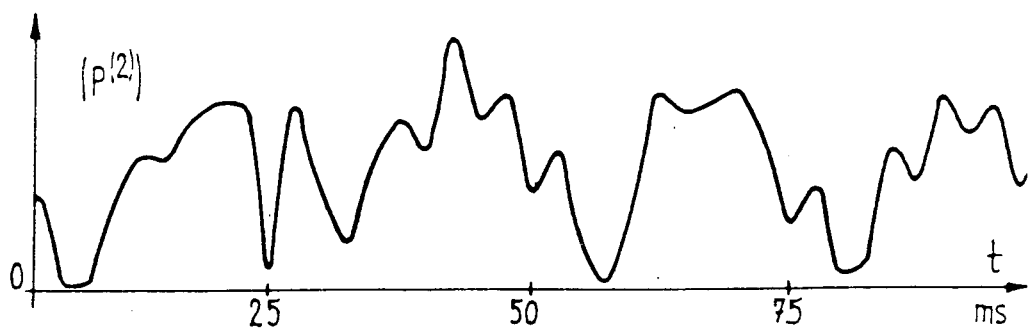
FIG_4-b
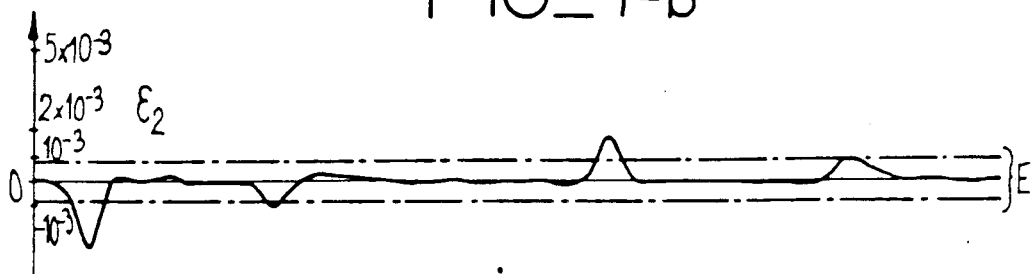
FIG_4-c
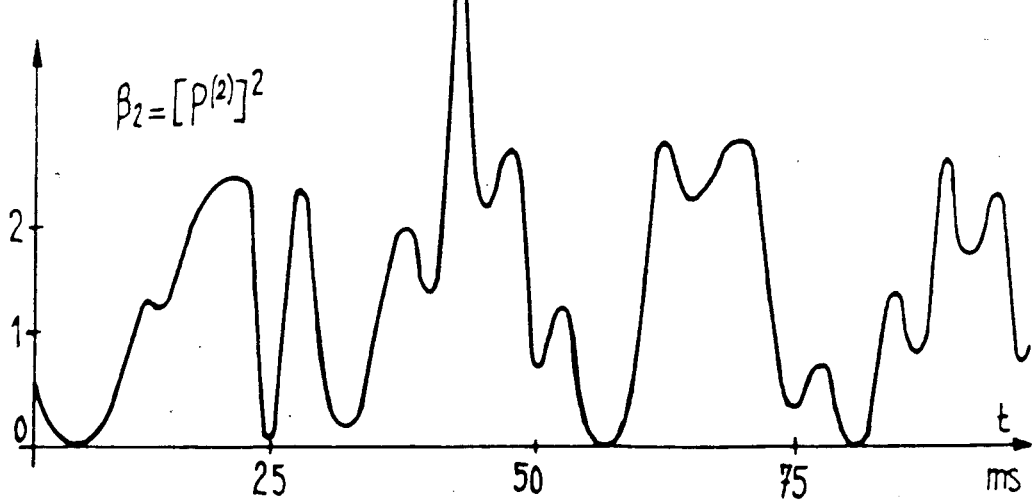

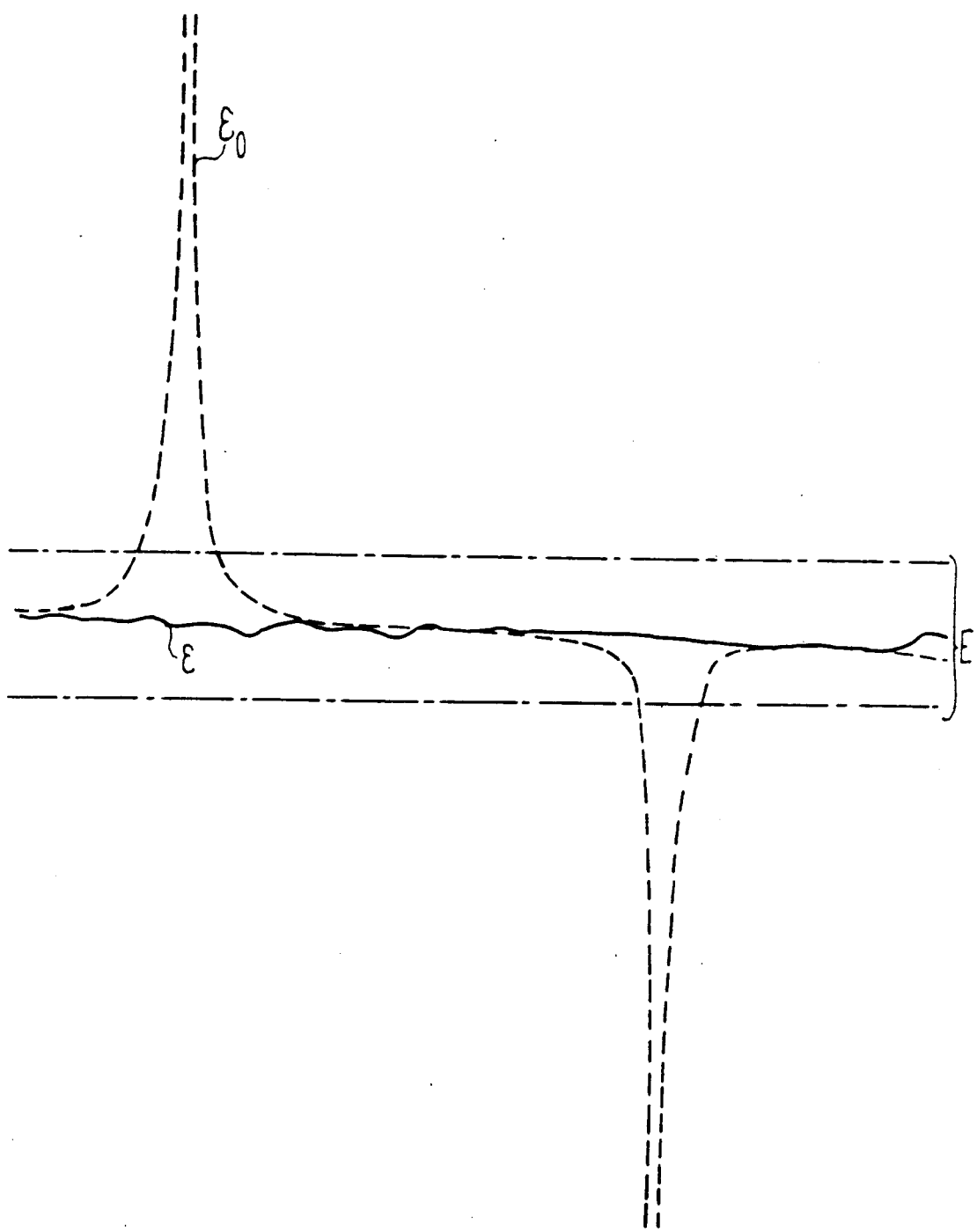
FIG_5

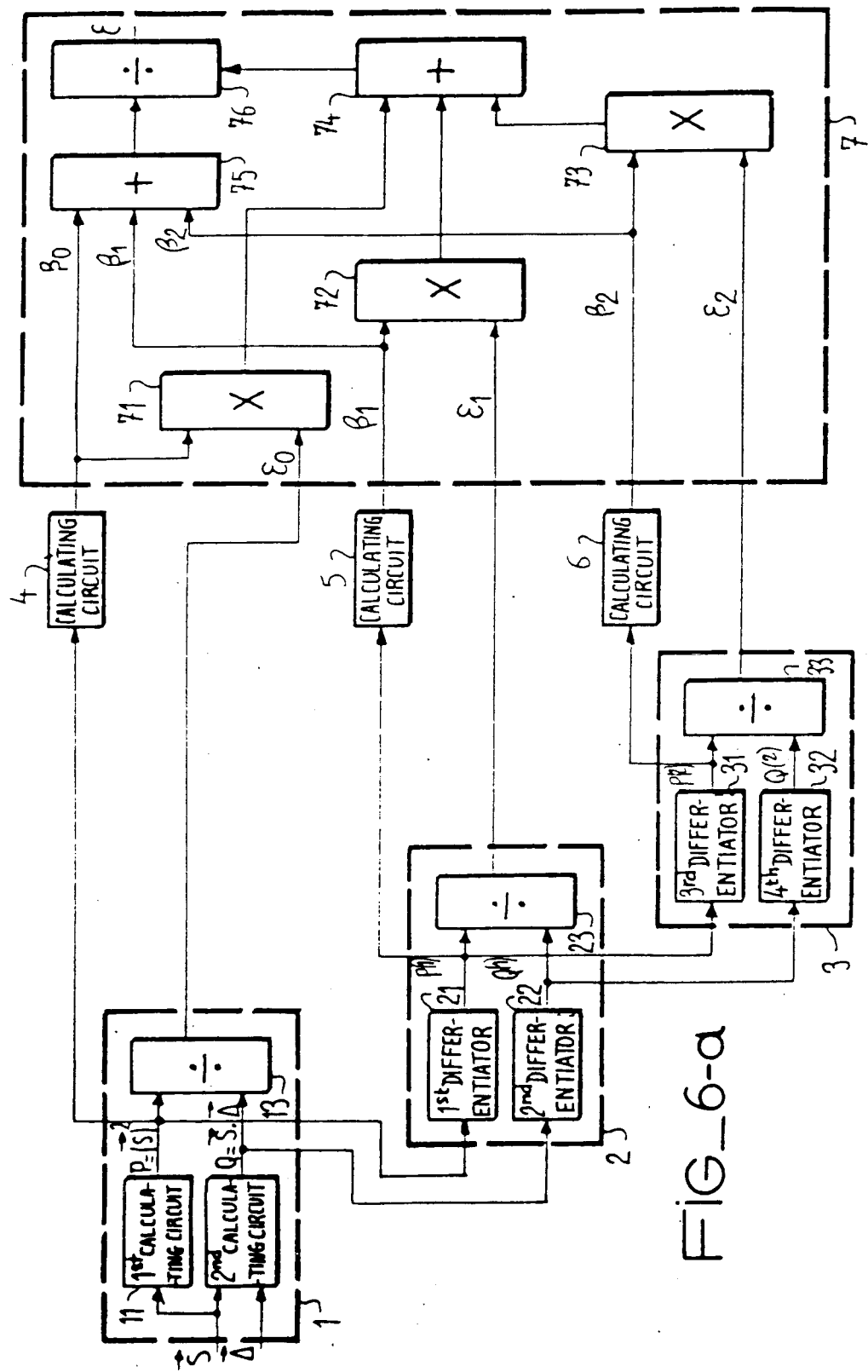
FIG_6-a

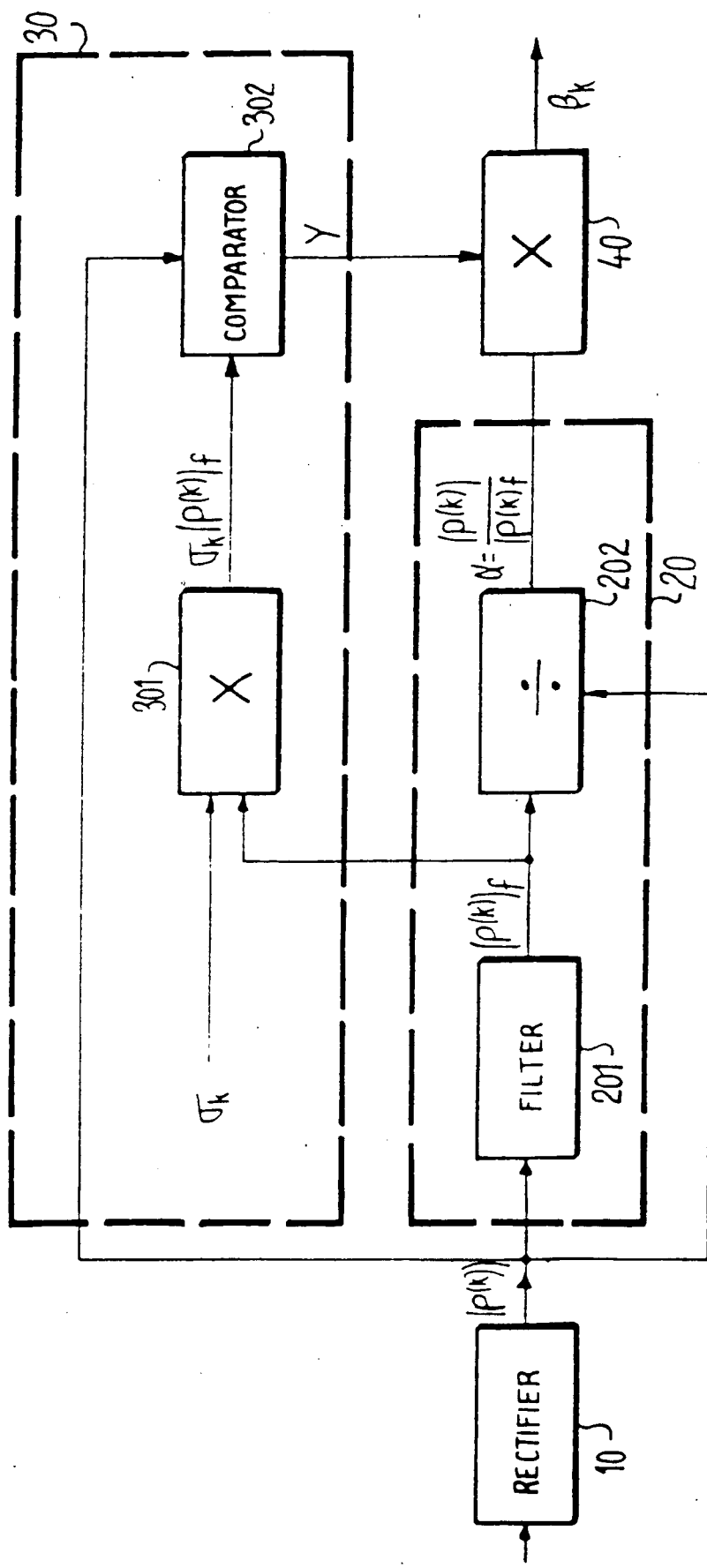

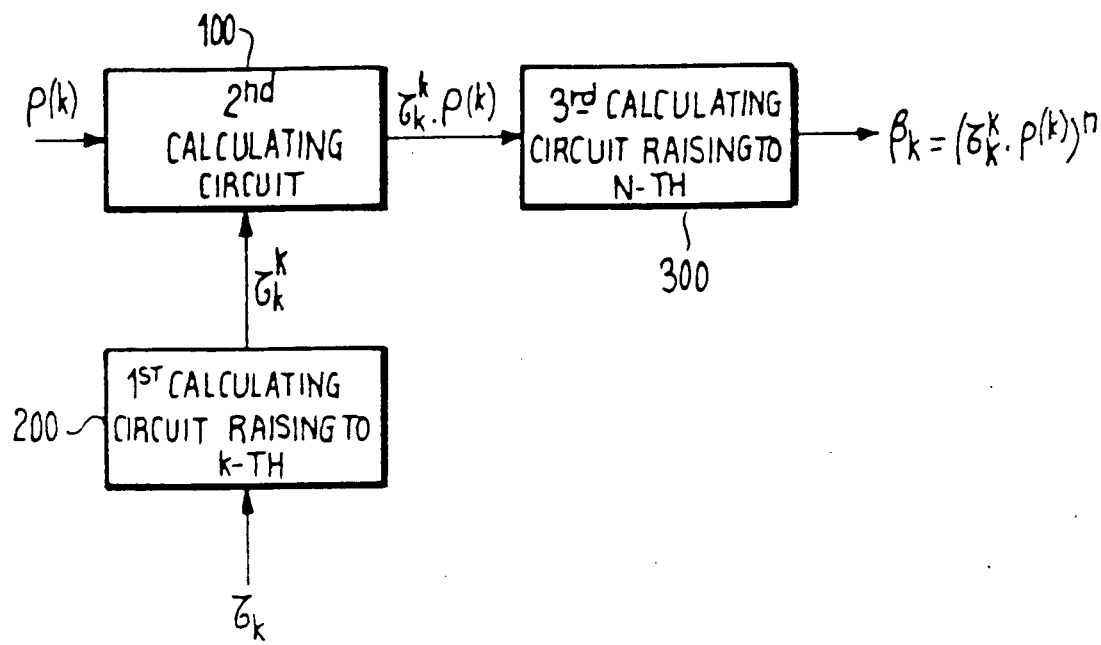
FIG_6-c

METHOD FOR INSTANTANEOUS PROCESSING OF THE GLINT NOISE AND TRACKING MONOPULSE RADAR RECEIVER CARRYING OUT THIS METHOD

BACKGROUND OF THE INVENTION

The present invention relates to a method for instantaneous processing of glint noise and to a tracking monopulse radar receiver for carrying out this method.

As is known, a monopulse radar is a tracking radar based on the comparison of two or more different antenna diagrams pointing towards the same target. The monopulse radar provides a measurement of the off-axis angle existing between the radar-target axis detected and the axis of the two antenna diagrams compared. There may be one or more measurements, for example in elevation and/or in relative bearing. The reception antenna diagrams are exploited in at least two reception channels designated as the "sum" channel processing a sum signal and at least one "difference" channel processing a difference signal for the reference plane in question (for example elevation or relative bearing).

If the target is not on the antenna axis in the plane considered the two reception channels receive different signals and comparison of the signals received makes it possible to locate the position of the target relative to the antenna axis. Now, comparing signals having different amplitude and phase with each other is not a simple problem and attempts have been made to reduce the problem to one of the following two cases corresponding to two types of monopulse processing:

"phase monopulse" processing, when the signals compared have amplitudes which are as similar as possible, but have variable relative phases;

"amplitude monopulse" processing, when the signals compared have phases, which are as similar as possible, but have variable relative amplitudes.

To simplify the explanation, the following comments maybe related to a plane, but they are also valid in the general case. Suppose that the target is a point target, that is to say consisting of a single reflecting point, and that the point is off the axis of the antenna by an angle $\theta$.

If the processing is of the second type, namely "amplitude monopulse" processing, the "sum" and "difference" channels receiving signals $\vec{S}$ and $\alpha$ respectively. These signals, which are in phase or in phase opposition, satisfy the following vector equation: $\Delta = g.\theta.\vec{S}$, g being a coefficient of proportionality.

By normalizing the off-axis angle $\theta$ relative to an angle $\theta_0$ for which $|\Delta| = |\vec{S}|$, the following equation is obtained: $\Delta = H.\vec{S}$ in which $\textcircled{H}$ is the normalized off-axis angle.

The "primary" angle-error measurement operator will be called $\epsilon_0$ and is defined in a known manner by the ratio (1) of the scalar product of the sum vector $\vec{S}$ and of the difference vector $\Delta$ to the square of the modulus of the sum vector $\vec{S}$.

$$\epsilon_0 = \frac{S \cdot \Delta}{|S|^2} \quad (1)$$

For a pin-point target, if there is no disturbing noise the primay angle-error measurement operator $\epsilon_0$ is equal to $\textcircled{H}$.

If, on the contrary, the target consists of a plurality N of bright points Mi, with i being between 1 and N, the sum vector $\vec{S}$ and the difference vector $\Delta$ sampled can be written as follows:

$$S = \sum_{i=1}^{N} a_i e^{j\phi_i} \quad (2)$$

$$\Delta = \sum_{i=1}^{N} a_i \textcircled{H}_i e^{j\phi_i} \quad (3)$$

In equations (2) and (3), $a_i$ and $\phi_i$ are respectively the amplitude and the phase of the elementary sum signal corresponding to the bright point Mi, and $\textcircled{H}_i$ is the normalized off-axis angle of each bright point Mi relative to the antenna axis.

The elementary parameters $a_i$ and $\textcircled{H}_i$ only change very slowly with time. However the elementary phase $\phi_i$ changes rapidly. It varies by $2\pi$ when the distance of the bright point Mi from the antenna varies by $\lambda/2$, where $\lambda$ is the wavelength of the signal transmitted.

The direction given by the primary angle-error measurement operator $\epsilon_0$, such as defined above by the equation $$\epsilon_0 = \frac{S \cdot \Delta}{|S|^2}$$

therefore undergoes fluctuations which can result in aiming at a point located far outside the wing-span E of the target.

This phenomenon which is called "glint", is particularly troublesome whenever it is desired to guide a projectile such as a missile towards a complex target.

Consequently it is necessary to overcome this phenomenon as much as possible and hence to reduce the so-called "glint" noise.

Several methods exist for reducing this glint noise. We mention only two:

The first method consists in isolating the signals from the various bright points of the target using the Doppler effect, since their relative phases change with time. If it is possible the direction of each point relative to the axis of the antenna can be measured separately.

A method of this type is described, in particular, in French Patent FR-A-2,466,025 in the name of the Applicant Company, corresponding to U.S. application Ser. No. 342,809, now abandoned.

The filtering effected in this way introduces a significant delay into the measurement of the angle-error.

Furthermore the frequency of the various signals changing with time makes them difficult to separate.

A second method is described in French Patent FR-A-2,396,311, also in the name of the Applicant Company, and corresponding to U.S. Pat. No. 4,220,953. The second method is based on the principle that the primary angle-error measurement operator $\epsilon_0$ is "good", that is to say provides a direction near to that of the barycenter of the target, when the modulus of the sum signal $\vec{S}$ is sufficiently high relative to its mean value $|\vec{S}|_{mean}$.

The second method has a better performance than the first method based on filtering. Nevertheless, the second method requires significant processing time because it is necessary to wait for the modulus $|\vec{S}|$ of the sum vector to pass through a relative maximum in order to have an angle-error measurement of good quality.

These two methods illustrate the major disadvantage of the methods of the prior art for overcoming the glint phenomenon as much as possible, namely the delay which they introduce during the calculation of the angle-error measurement operator.

The present invention makes it possible to overcome this disadvantage and relates to a method for processing glint noise from a target, which method, when used in radar receiver, makes it possible to obtain the direction of the target with a reduced glint noise, without additional delay.

SUMMARY OF THE INVENTION

According to the invention, a weighted average of the derived deflection measurement operator is calculated; these derived operators are respectively equal to the ratios of the derivatives of the scalar product of the sum vector and difference vector to the power received, and it can be shown that they are each a weighted average of the off-axis angles $(H)_i$ of each of the bright points of the target.

According to the invention, a method for processing the glint noise in a monopulse radar comprises the following calculation steps in succession, starting from the sum signal $\vec{S}$ and difference signal $\Delta$ which are produced by the antenna and whose phase varies as a function of time:

calculating relative to time successive derivatives $Q^{(k)}$ of order k, from k=0 up to k=N' (N'≥2), of the scalar product $Q = \vec{S} \cdot \Delta$ of the sum signal $\vec{S}$ and difference signal $\Delta$;

calculating, relative to time, the successive derivatives $P^{(k)}$ of order k, from k=0 up to k=N', of the power $P = |\vec{S}|^2$ of the signal received, which is equal to the square of the modulus of the sum signal $\vec{S}$;

calculating the (N'+1) derived angle-error measurement operators $$\epsilon_K = \frac{Q^{(k)}}{P^{(k)}} \text{ for } k = 0 \text{ up to } k = N';$$

for k=0 up to k=N'; and
calculating the combined angle-error measurement operator $\epsilon$ such that $$\epsilon = \frac{\sum_{k=0}^{N'} \beta_K \cdot \epsilon_K}{\sum_{k=0}^{N'} \beta_K}$$

in which the (N'+1) weighting coefficients $\beta_k$, for k=0 to k=N', are coefficients characterizing the quality, relative to the angle-error measurement of the barycenter of the target, of the derived angle-error measurement operators $\epsilon_k$ respectively.

BRIEF DESCRIPTION OF THE DRAWINGS

The present invention will be understood more clearly on reading the detailed description given below with reference to the attached figures, in which:

FIG. 1 shows a flow chart illustrating the steps of the method according to the invention;

FIGS. 2a to 2c show curves illustrating the variations with time in the power P of the signal received, in the primary angle-error measurement operator, and in the associated "quality" coefficient, respectively;

FIGS. 3a to 3c, show curves illustrating the variations with time in the modulus of the 1st order derivative of the power P, in the corresponding derived angle-error measurement operator, and in its quality coefficient, respectively;

FIGS. 4a to 4c show curves illustrating the variations with time in the modulus of the 2nd order derivative of the power P, in the corresponding derived angle-error measurement operator, and in its quality coefficient, respectively;

FIG. 5 shows curves illustrating the variations with time in the primary and combined angle-error measurement operators;

FIG. 6a shows an embodiment of a radar receiver for carrying out the method according to FIG. 1;

FIG. 6b shows a first detailed embodiment of the radar receiver of FIG. 6a; and

FIG. 6c shows a second detailed embodiment of the radar receiver of FIG. 6a.

DESCRIPTION OF PREFERRED EMBODIMENTS

As the processing method according to the invention is a digital processing method, it is assumed that the radar carrying out the processing is equipped with circuits for sampling (at sampling frequency 1/Te) the "sum" and "difference" signals delivered by the antenna, and with digital processing circuits.

It is recalled that, in the case of a target consisting of N bright points Mi (i=1 to N), the sum signal $\vec{S}$ and difference signal $\Delta$ are written as follows:

$$S = \sum_{i=1}^{N} a_i e^{j\phi_i} \quad (2)$$

$$\Delta = \sum_{i=1}^{N} a_i (H)_i e^{j\phi_i} \quad (3)$$

The power P of the signal received can be deduced from expressions (2) and (3):

$$P = |S|^2 = \sum_{i=1}^{N} a_i^2 + 2 \sum_{i<j} a_i a_j \cos(\phi_i - \phi_j) \quad (4)$$

as well as the scalar product Q of the sum signal $\vec{S}$ and difference signal $\Delta$:

$$Q = S \cdot \Delta = \sum_{i=1}^{N} a_i^2 (H)_i + \sum_{i\Delta} a_i a_j ((H)_i + (H)_j)\cos(\phi_i - \phi_j) \quad (5)$$

The successive derivatives are calculated taking only account of the variations in the phase $\phi_i$, as the quantities $a_i$ and $(H)_i$ only vary slowly with time:

$$P^{(k)} = 2 \sum_{i<j} a_i a_j [\cos(\phi_i - \phi_j)]^{(k)} \quad (6)$$

$$Q^{(k)} = \sum_{i<j} a_i a_j ((H)_i + (H)_j) [\cos(\phi_i - \phi_j)]^{(k)} \quad (7)$$

in which expressions $\cos(\phi_i - \phi_j)^{(k)}$ denotes the derivative of order k of $\cos(\phi_i - \phi_j)$.

If the following expression is denoted $\gamma_{k,i}$:

$$\gamma_{k,i} = \sum_{j \neq i} a_i a_j [\cos(\phi_i - \phi_j)]^{(k)}$$

the derivatives of order k of P and Q which are given by equations (6) and (7) are more simply expressed by the following equations (8) and (9), since equation (4) (for P) can be deduced from equation (5) (for Q) by making $(H)_i = 1$ for every i.

$$P^{(k)} = \sum_{i=1}^{N} \gamma_{k,i} \qquad (8)$$

$$Q^{(k)} = \sum_{i=1}^{N} \gamma_{k,i} (H)_i \qquad (9)$$

If the following ratio is called the derived operator $\epsilon_k$:

$$\epsilon_k = \frac{S \cdot \Delta^{(k)}}{[|S|^2]^{(k)}} = \frac{Q^{(k)}}{P^{(k)}} = \frac{\sum_{i=1}^{N} \gamma_{k,i} (H)_i}{\sum_{i=1}^{N} \gamma_{k,i}}$$

it can be seen that $\epsilon_k$ is a weighted average of the angles $(H)_i$ with corresponding weighting coefficients $\gamma_{k,i}$.

Each derived operator $\epsilon_k$ is homogeneous with an angle measurement. The better its "quality", that is to say its angle-error relative to the, barycenter of the target, the greater the absolute value of the denominator $P^{(k)}$, that is to say the derivative of order k, of the power received.

According to the invention, the angle-error measurement operator $\epsilon$ is taken to be equal to:

$$\epsilon = \frac{\sum_{k=0}^{N'} \beta_K \cdot \epsilon_K}{\sum_{k=0}^{N'} \beta_K}$$

which is the weighted average of (N'+1) derived operators $\epsilon_k$, the weighting being effected by means of "quality" coefficients $\beta_k$, that is to say of coefficients depending on the quality of the derived angle-error measurement operator $\epsilon_k$ relative to the angle-error measurement of the barycenter of the target.

As was already mentioned, the better the quality the greater the absolute value of the denominator $p^{(k)}$ of the derived operator $\epsilon_k$; it is therefore possible, in a non-limiting way, to take a quality coefficient $\beta_k$ which is a function of $|P^{(k)}|$.

This suggests, for example, according to a first solution, taking the quality coefficient $\beta_k$ to be equal to the ratio $$a_k = \frac{|P^{(k)}|}{|P^{(k)}|_f} = \frac{A_k}{A_{kf}}$$

of the modulus $A_k$ of the derivative of order k of the power P of the signal received to the same quantity $A_k$ but "filtered", in order to normalize $|P^{(k)}|$. The "filtered" quantity $A_{kf}$ is, for example, equal to the average value of $A_k = |P^{(k)}|$ over the previous interval of time.

Low values (below a chosen threshold $p_k$ respectively) of $|P^{(k)}|$ lead to errors in $\epsilon_k$ such that the weighting is not sufficient to overcome them. In practice, corresponding quality coefficients will be chosen equal to zero: for values of $|P^{(k)}|$ less than or equal to a threshold $P_k$ corresponding to a fraction $\sigma_k$ of the filtered value $|P^{(k)}|_f$ (or if $a_k$ is less than or equal to $\sigma_k$), the quality coefficient $\beta_k$ is taken equal to zero.

The circuits calculating the coefficients $\beta_k$ according to the first solution are shown by FIG. 6b.

According to a second solution, the quality coefficients $\beta_k$ can be taken equal respectively to $(\tau_k^k \cdot P^{(k)})^n$ with n a positive integer higher than or equal to 2 and $\tau_k$ a time constant for making the expression of the combined angle-error measurement operator $\epsilon$ homogeneous. In the case of digital processing, $\tau_k$ can be taken equal to the sampling period Te (for any k from 0 to N'). In the case of analog processing, $\tau_k$ can be the processing time constant.

As a matter of fact the (N'+1) coefficients $\beta_k$ should not only characterize the quality of the corresponding derived angle error measurement operator $\epsilon_k$ with respect to the angle-error measurement of the barycenter of the target, but also induce no damage to the spectral density of the combined operator $\epsilon$, whatever the signal-to-noise ratio and the fluctuation degree of the target are. Now, in the case when the target does not fluctuate (or fluctuates very slowly) but is low in thermal noise, the spectral density of the combined operator $\epsilon$, which is calculated from the chosen quality coefficients, can become much higher than that of the primary angle-error measurement operator $\epsilon_0$ (or derived operator of order k=0).

The quality coefficients according to the second solution allow the relative variations of the successive derivatives $|P^{(k)}|$ of power P to be better compensated without damaging the spectral density of the combined operator $\epsilon$ relative to that of the primary operator $\epsilon_0$.

The calculation steps below comprise a method according to the invention as illustrated by the flow chart in FIG. 1:

The following are calculated successively starting from the sum signal $\vec{S}$ and the difference signal $\Delta$ delivered by the reception antenna:

the scalar product $Q = \vec{S} \cdot \Delta$ of the two signals $\vec{S}$ and $\Delta$, and its successive derivatives $Q^{(k)}$ of order k from 1 to N', with respect to time;

the power $P = |\vec{S}|^2$ of the signal received, and its successive derivatives $P^{(k)}$ of order k from 1 to N', with respect to time;

the (N'+1) derived angle-error measurement operators $$\epsilon_k = \frac{Q^{(k)}}{P^{(k)}},$$

which are the ratio of the derivative $Q^{(k)}$ to the derivative $P^{(k)}$ of the scalar product Q and of the power P respectively, and also the quality coefficients $\beta_k$ associated with the derived operators $\epsilon_k$ and calculated from the derivative of order k of the power P of the signal received, with k being between 0 and N'; and the combined angle-error measurement operator $$\epsilon = \frac{\sum_{k=0}^{N'} \beta_K \cdot \epsilon_K}{\sum_{k=0}^{N'} \beta_K}$$

FIGS. 2a to 2c, 3a to 3c, 4a to 4c and 5 have been obtained by a digital simulation in which the target is assumed to consist of six bright points (N=6), to which relative amplitudes of the reflected signals equal respectively to ten, nine, two, two, two and two, correspond, and to be moving relative to the radar antenna.

FIGS. 2a to 2c, 3a to 3c, 4a to 4c, and 5 show the change in certain quantities with time. The short time interval considered, namely 100 ms, explains the pseudo-periodic character of the phenomena.

It is assumed that the radar receiver is equipped with circuits for sampling the sum and difference signals (these circuits are not illustrated in the figures) delivered by the antenna, and with digital processing circuits delivering sampled and coded sum signal $\bar{S}$ and difference signal $\Delta$.

FIGS. 2a, 3a and 4a show the variations in the modulus of the derivative $P^{(k)}$ of order k of the power $P = |\bar{S}|^2$ of the signal received by the antenna, for k=0, 1 and 2 respectively (N'=2).

FIGS. 2b, 3b and 4b show the variations in the derived operator $$\epsilon_k = \frac{Q^{(k)}}{P^{(k)}}$$

(Q denoting the scalar product of the sum signal $\bar{S}$ and difference signal $\Delta$), which is the ratio of the derivative of order k of the scalar product Q to the derivative of order k of the power P, for k=0, 1 and 2 respectively.

These figures also indicate the wing-span E of the target, so that the angle-error measurement provided by the derived operators $\epsilon_k$ (k=0,1,2) can be positioned relative to the wing-span E of the target and to the barycenter of the bright points associated with their amplitude.

It should be noted, in FIGS. 2b, 3b, 4b, that the derived angle-error measurement operator calculated at certain instants moves out of the wing-span E of the target and would consequently provide erroneous data. This is the case, in particular, in FIG. 2b for the primary angle-error measurement operator (K=0) used, for example, in the second method of the prior art (mentioned in the introduction), where the angle-error measurement data provided by $\epsilon_0$ would only be taken into account if the power $P^{(k)}$ of the signal received exceeded a certain threshold and reached a relative maximum, that is to say, in the case of FIGS. 2a, 2b, after a measurement time of about forty milliseconds.

FIGS. 2c, 3c and 4c show the quality coefficients $\beta_k$ (k=0, 1 and 2 respectively) used, which here are taken equal to $$\beta_k = (\tau_k^k \cdot P^{(k)})^n$$

with n=2 and $\tau_k$=Te, the sampling period Te being here equal to 10 ms.

The filtered value $|P^{(k)}|_f$ results from the filtering of the average value of $|P^{(k)}|$ in a first order filter with a time constant of 50 ms.

The shape of the curves illustrating variations in $\beta_0$, $\beta_1$, $\beta_2$ (FIGS. 2c, 3c, 4c) is similar to that of the variations in P, $|P^{(1)}|$, $|P^{(2)}|$.

FIG. 5 shows both the curve illustrating the variation in the primary angle-error measurement operator $\epsilon_o$, used in the prior art, and the curve illustrating the variation in the combined angle-error measurement operator=

$$\frac{\sum_{k=0}^{N'} \beta_k \cdot \epsilon_k}{\sum_{k=0}^{N'} \beta_k}$$

the number of derived operators $\epsilon_k$ being limited to 3 (N'=2) (k=0,1,2). The scale of FIG. 5 is expanded relative to that of FIGS. 2b, 3b, 4b. The wing-span E is also indicated so that the qualities of the primary operator $\epsilon_0$ and combined operator $\epsilon$ can be compared. It can thus be seen that the variations in the combined angle-error measurement operator with time are entirely within the wing-span E of the target, which is not the case for the primary operator $\epsilon_0$.

In fact, in FIGS. 2a, 3a, 4a, the quantities P, $|P^{(1)}|$, $|P^{(2)}|$ are never at a minimum at the same time. At least one of the primary or derived operators $\epsilon_0$, $\epsilon_1$, $\epsilon_2$ therefore provides an angle-error measurement of good quality, and the weighted linear combination $\epsilon$ is of good quality over the entire time interval observed.

The combined angle-error measurement operator $\epsilon$ can be qualified as "instantaneous" in contrast to the filtered or selected angle-error measurement operator of the prior art mentioned in the introduction to the description. In fact, any derivative of a function can be calculated in as short a time as is desired. In practice, the derivatives are obtained by finite differences. The processing time therefore depends only on the sampling period of the signal and on the order k of the derivative.

The fact that $|P^{(k)}|$ is filtered in order to determine the quality coefficient $\beta_k$ according to the first solution in no way detracts from this "instantaneousness", because $\beta_k$ is only a weighting coefficient applied to $\epsilon_k$.

It is necessary for the target to be tracked correctly by the radar; in particular, a good angular tracking is necessary in order to remain in the region of linearity of the angle-error measurements.

FIG. 6a shows a non-limiting embodiment of part of an amplitude monopulse tracking radar receiver using the method according to the invention, in which the combined angle-error measurement operator $\epsilon$ is obtained, as in FIG. 5, by the linear combination of three primary and derived deflection measurement operators $\epsilon_0$, $\epsilon_1$, $\epsilon_2$ (k=0, 1, 2).

This limitation of the number of derived operators to three (N'=2) (see FIG. 5) gives a reliable angle-error measurement $\epsilon$, in contrast to the primary angle-error measurement operator $\epsilon_0$, but is a non-limiting example given for the purpose of simplifying the representation of the radar receiver. The number N' of operators is greater than or equal to two.

In a known manner, the antenna (not shown) produces the sum and difference signals from the signals reflected by the target; before being digitally processed by the radar receiver in FIG. 6a, the sum and difference signals are sampled and then coded in circuits (not shown) which deliver sum signals $\bar{S}$ and difference signals $\Delta$.

The sub-units 1, 2, 3 calculate the derived angle-error measurement operators $\epsilon_0$, $\epsilon_1$, $\epsilon_2$, respectively, from the sampled and coded sum signal S and difference signal $\Delta$.

The sub-units 4, 5, and 6 determine the weighting coefficients $\beta_0$, $\beta_1$, $\beta_2$ corresponding to the "quality" of each of the primary or derived angle-error measurement operators $\epsilon_0$, $\epsilon_1$, $\epsilon_2$ respectively.

Finally, the sub-unit 7 calculates the combined angle-error measurement operator from the primary and derived operators $\epsilon_0$, $\epsilon_1$, $\epsilon_2$ and from the quality coefficients $\beta_0$, $\beta_1$, $\beta_2$, the combined operator being equal to the linear sum of the primary and derived operators $\epsilon_0$, $\epsilon_1$, $\epsilon_2$, weighted by the quality coefficients $\beta_0$, $\beta_1$, $\beta_2$ associated with each operator.

$$\epsilon = \frac{\beta_0' \cdot \epsilon_0' + \beta_1' \cdot \epsilon_1 + \beta_2 \cdot \epsilon_2}{\beta_0 + \beta_1 + \beta_2}$$

The first sub-unit 1 includes a first calculating circuit 11, which receives the sampled and coded sum signal $\bar{S}$ and calculates the power P of the signal received equal to the square $|\bar{S}|^2$ of the modulus of the input sum signal $\bar{S}$. The first calculating circuit 11 can include a rectifying circuit (not shown) in series with a multiplying circuit (not shown) receiving the rectified signal $\bar{S}$ at each of its two inputs. The sub-unit 1 also includes a second calculating circuit 12, which receives the sampled and coded sum signal $\bar{S}$ and difference signal $\Delta$ at two inputs and calculates the scalar product $Q = \bar{S} \cdot \Delta$ of these two signals.

The two signals P and Q delivered by the first and second calculating circuits 11 and 12 respectively are applied to the input of a dividing circuit 13 calculating the ratio $(Q/P) = \epsilon_0$, which is the zero order derived angle-error measurement operator or primary angle-error measurement operator.

The second sub-unit 2 includes first and second differentiators 21 and 22, which respectively receive the signals P and Q from the first and second calculating circuits 11 and 12 and respectively deliver the signals $P^{(1)}$ and $Q^{(1)}$, which are the 1st order derivatives with respect to time of the signals P and Q applied to their inputs. The sub-unit 2 also includes a dividing circuit 23, which, fed with the signals $P^{(1)}$ and $Q^{(1)}$ supplied by the differentiating circuits 21 and 22 respectively, delivers the first order derived angle-error measurement operator $\epsilon_1$.

The signals $P^{(1)}$ and $Q^{(1)}$ also feed third and fourth differentiators 31 and 32 respectively, which, together with a dividing circuit 33, form the third subunit 3. The third and fourth differentiators 31 and 32 respectively deliver signals $P^{(2)}$ and $Q^{(2)}$ corresponding to the derivative, with respect to time, of the input signals $P^{(1)}$ and $Q^{(1)}$, and hence to the second derivative, with respect to time, of the power signal P and scalar product signal Q produced by the first and second calculating circuits 11 and 12. The signals $P^{(2)}$ and $Q^{(2)}$ feed the dividing circuit 33, which calculates their ratio $$\epsilon_2 = \frac{Q^{(2)}}{P^{(2)}},$$

this being the second order derived angle-error measurement operator.

For a larger number of derived angle-error measurement operators, (N'>2), the operators $\epsilon_k$ are calculated by sub-units each consisting of two differentiators and of one divider, in the same way as the sub-units 2 and 3.

The sub-units 4, 5, 6 determine the quality coefficients $\beta_k$ (k=0, 1, 2) serving to weight the primary and derived angle-error measurement operators $\epsilon_k$.

If, as mentioned above with reference to FIG. 1, the coefficients $\beta_k$ are chosen according to the first solution to be equal to zero or to the ratio $$\alpha_k = \frac{|P^{(k)}|}{|P^{(k)}|_f} = \frac{A_k}{A_{kf}}$$

in which $A_k = |P^{(k)}|$ is the modulus of the derivative of order k of the power P of the signal received and $|P^{(k)}|_f$ is the filtered value $A_{kf}$ of the previous quantity $A_k = |P^{(k)}|$, the sub-units 4, 5, 6 can be embodied in an identical non-limiting manner, which is illustrated in FIG. 6b and described later with reference to this Figure.

The signal $P^{(k)}$ delivered by the first calculating circuit 11 (k=0) for the sub-unit 4, or by the first differentiator 21 (k=1) for the sub-unit 5, or by the third differentiator 31 (k=2) for the sub-unit 6, is rectified by the circuit 10.

The rectified signal $A_k = |P^{(k)}|$ is applied to the input of the normalizing circuit 20. This circuit 20 includes, for example, a filter 201 which delivers a filtered signal $|P^{(k)}|_f$ to the first input of a dividing circuit 202, the second input of this divider 202 receiving the output signal $|P^{(k)}|$ from the rectifier 10. The divider 202 calculates the ratio $$\alpha_k = \frac{|P^{(k)}|}{|P^{(k)}|_f}$$

of the input signals, this ratio $\alpha_k$ being a normalized value of the rectified signal $A_k = |P^{(k)}|$ and also a non-corrected value of the quality coefficient $\beta_k$.

As mentioned earlier in the description, the low values of $|P^{(k)}|$ lead to errors in $\epsilon_k$, and these errors can be eliminated by taking the corresponding quality coefficient $\beta_k$ to be equal to zero. Comparison of the ratio $$\alpha_k = \frac{|P^{(k)}|}{|P^{(k)}|_f}$$

with the threshold $\sigma_k$ is effected by the circuit 30, which delivers a pulse signal Y whose level is equal to:
"0" if $|P^{(k)}| \leq \sigma_k \cdot |P^{(k)}|_f$
"1" if $|P^{(k)}| > \sigma_k \cdot |P^{(k)}|_f$ This can be effected, for example, by a multiplying circuit 301 and a comparison circuit 302, forming the threshold circuit 30.

The multiplier 301 receives the signal $|P^{(k)}|_f$ from the output of the filter 201 of the normalizing circuit 20, and a threshold $\sigma_k$ from an external memory (not shown), and delivers the signal $\sigma_k \cdot |P^{(k)}|_f$ to the input of the comparator 302. The second input of the comparator 302 receives the signal $|P^{(k)}|$ from the output of the rectifying circuit 10.

The pulse signal Y at the output of the comparator 302 and the signal $$\alpha_k = \frac{|P^{(k)}|}{|P^{(k)}|_f},$$

deliverd by the divider 202 of the normalizing circuit 20, are applied respectively to the first and second inputs of a multiplying circuit 40, the output $\beta_k$ of which is equal to the ratio $$\alpha_k = \frac{|P^{(k)}|}{|P^{(k)}|_f}$$

if this ratio is greater than $\sigma_k$, and to zero if this ratio is less than or equal to $_k$.

It is this corrected value $\beta_k$ which is used for weighting the primary and derived angle-error measurement operators $\epsilon_k$ in the sub-unit 7 in FIG. 6a: $\beta_0$ (k=0) for the sub-unit 4, $\beta_1$ (k=1) for the sub-unit 5, $\beta_2$ (k=2) for the sub-unit 6.

When the quality coefficients $\beta_k$ (k=0,1,2, . . . ) are chosen, according to the second solution, equal to $[\tau_k{}^k.P^{(k)}]^n$, the sub-unit 4,5,6 can be embodied as shown by FIG. 6c.

The signal $P^{(k)}$, which is delivered by the first calculating circuit (k=0) for the sub-unit 4, or by the first differentiator 21 (k=1) for the sub-unit 5, or by the third differentiator 31 (k=2) for the sub-unit 6, is multiplied, in a circuit 100, by the homogenizing coefficient $\tau_k{}^k$. This homogenizing coefficient $\tau_k{}^k$ is delivered by a circuit 200 raising to the k-th power k=0 for sub-unit 4, k=1 for sub-unit 5 and k=2 for sub-unit 6 . . . ) the time constant $\tau_k$ with which it is supplied. The result $\tau_k{}^k.P^{(k)}$ of the multiplication delivered by the circuit 100 is then raised to the n-th power (n$\geq$2) by a circuit 300 which delivers the quality coefficient $\beta_k=[\tau_k{}^k.P^{(k)}]^n$.

The last sub-unit, 7, effecting the weighted combination of the operators $\epsilon_k$, includes three multiplying circuits 71, 72, 73, each receiving a derived angle-error measurement operator, respectively zero order or primary operator $\epsilon_0$ (from the output of the sub-unit 1), first order derived operator $\epsilon_1$ (from the output of the sub-unit 2), second order derided operator $\epsilon_2$ (from the output of the sub-unit 3), and the associated quality coefficient, namely respectively $\beta_0$ (from the output of the sub-unit 4), $\beta_1$ (from the output of the sub-unit 5), $\beta_2$ (from the output of the sub-unit 6). The multipliers 71, 72, 73 deliver a signal $\beta_0.\epsilon_0, \beta_1.\epsilon_1, \beta_2.\epsilon_2$ respectively.

The sub-unit 7 also includes first and second adding circuits 74 and 75. The first adding circuit 74 receives, at its three inputs, each of the output signals $\beta_0.\epsilon_0, \beta_1.\epsilon_1, \beta_2.\epsilon_2$ from the multiplying circuits 71, 72, 73 respectively, and delivers a signal $\beta_0.\epsilon_0+\beta_1.\epsilon_1+\beta_2.\epsilon_2$. The second adding circuit 75 receives at its three inputs respectively the output signals $\beta_0, \beta_1, \beta_2$ from the sub-units 4, 5, 6 and delivers a signal $\beta_0+\beta_1+\beta_2$.

Finally, the sub-unit 7 includes a dividing circuit 76 fed with the respective output signals from the adding circuits 74 and 75 and delivering the combined angle-error measurement operator $\epsilon$ which is the ratio of the two input signals:

$$\epsilon = \frac{\beta_0 \cdot \epsilon_0 + \beta_1 \cdot \epsilon_1 + \beta_2 \cdot \epsilon_2}{\beta_0 + \beta_1 + \beta_2}$$

As already mentioned above, the angle-error measurement operator $\epsilon$ thus obtained can be qualified as instantaneous because it can be obtained after a time which depends on the sampling period and on the maximum order (N'$\geq$2) of the derived angle-error measurement operators involved in the calculation of the combined operator $\epsilon$.

The combined angle-error measurement operator $\epsilon$ obtained in a virtually instantaneous manner by the method according to the invention has a reduced glint noise and a better target-tracking capability from the point of view of the tracking precision and the measurement time.

What is claimed:

1. A method for processing glint noise in a monopulse radar having an antenna which receives a signal and produces sum signal $\bar{S}$ and difference signal $\Delta$ whose phases vary as functions of time, comprising the following steps;

calculating successive derivatives $Q^{(k)}$ of order k, as a function of time, from k=0 up to k=N' (N'$\geq$2), of the scalar product $Q=\bar{S}.\Delta$ of the sum signal $\bar{S}$ and difference signal $\Delta$;

calculating successive derivatives $p^{(k)}$ of order k, as a function of time, from k=0 up to k=N', of the power $P=|\bar{S}|^2$ of the signal received, which is equal to the square of the modulus of the sum signal $\bar{S}$:

calculating (N'+1) derived angle-error measurement operators $$\epsilon_\kappa = \frac{Q^{(k)}}{P^{(k)}} \text{ for } k = 0 \text{ up to } k = N';$$

and calculating a combined angle-error measurement operation $\epsilon$ such that $$\epsilon = \frac{\sum_{k=0}^{N'} \beta_\kappa \cdot \epsilon_\kappa}{\sum_{k=0}^{N'} \beta_\kappa}$$

in which (N'+1) weighting coefficients $\beta_\kappa$, for k=0 to k=N', are coefficients depending on the quality, relative to the angle-error measurement of the barycenter of the target, of the derived angle-error measurement operators $\epsilon_{78}$ which correspond thereto.

2. A processing method according to claim 1, wherein said step of calculating a combined angle-error measurement operator includes the step of providing quality coefficients $\beta_\kappa$ which are proportional to the modulus $A_k=|P^{(k)}|$ of the derivative, with respect to time, of the power P of the signal received.

3. A processing method according to claim 1, wherein said step of calculating a combined angle-error measurement operator includes the step of providing quality coefficient $\beta_k$ which are respectively equal to the ratios $$\alpha_k = \frac{|P^{(k)}|}{|P^{(k)}|_f},$$

where $|P^{(k)}|_f$ is a filtered value of $A_k=|P^{(k)}|$.

4. A processing method according to claim 1, wherein the quality coefficients $\beta_k$ are corrected and set equal to zero if $A_k=|P^{(k)}|$ is less than or equal to a positive threshold $p_k$.

5. A processing method according to claim 1, wherein said step of calculating a combined angle-error measurement operator includes the step of providing (N'+1) quality coefficients $\beta_\kappa$, with k from 0 to N', which are respectively equal to $$\beta_\kappa=[\tau_\kappa{}^\kappa.P^{(k)}]^n$$

where $\tau_k$ is a time constant and n is a positive integer higher than or equal to 2.

6. A monopulse radar receiver associated with a monopulse antenna which receives signals returned by a target and produces sum and difference signals, and which is provided with sampling and coding means which delivers coded sum signals $\bar{S}$ and coded difference signals $\Delta$, comprising:

first means for calculating with respect to time successive derivatives $P^{(k)}$ of order k, k being between 0 and $N'(N' \geq 2)$, of the power $P = |\bar{S}|^2$ of a signal received;

second means for calculating with respect to time successive derivatives $Q^{(k)}$ of order k, k being between 0 and N' of the scalar product $Q = S \cdot \Delta$ of the sum signal $\bar{S}$ and difference signal $\Delta$;

third means for calculating each derived angle-error measurement operator $$\epsilon_k = \frac{Q^{(k)}}{P^{(k)}}$$

of order k, k being between 0 and N', which is equal to the ratio of the derivatives of order k of the scalar product $Q = \bar{S} \cdot \Delta$ and of the power $P = |\bar{S}|^2$ of the signal received with respect to time;

fourth means for calculating a coefficient $\beta_k$ which is associated with each derived angle-error measurement operator $\epsilon_k$ of order k, of between 0 and N', and which characterises the quality of the respective operator $\epsilon_k$ relative to the angle-error measurement of the barycenter of the target; and fifth means for calculating a combined angle-error measurement operator $\epsilon$ which is equal to the linear combination of the $(N'+1)$ derived angle-error measurement operators $\epsilon_k$ weighted by the associated quality coefficients $\beta_k$.

7. A radar receiver according to claim 6, wherein the first calculating means includes:

a first circuit for calculating the power $p^{(o)} = P = |\bar{S}|^2$ of the signal received, from the sampled and coded sum signal $\bar{S}$, in series with a plurality N' of differentiators arranged in series, the differentiator of order k between 1 and N' calculating the derivative with respect to time of the signal $P^{(k-1)}$ applied to its input.

8. A radar receiver according to claim 6, wherein the second calculating means includes:

a first circuit for calculating the scalar product $Q^{(o)} = Q = \bar{S} \cdot \Delta$ of the sampled and coded sum signal $\bar{S}$ and difference signal $\Delta$, in series with a plurality N' of differentiators arranged in series, the differentiator of order k, k being between 1 and N', calculating the derivative with respect to time of the signal $Q^{(k-1)}$ applied to its input.

9. A radar receiver according to claim 6, wherein the third calculating means includes a plurality of $(N'+1)$ dividers each divider, of order k of between 0 and N' receiving at a first input the signal $P^{(k)}$ delivered by the first calculating means and at a second input the signal $Q^{(k)}$ delivered by the second calculating means, and calculating the ratio $\epsilon_k$ of the second input signal to the first input signal.

10. A radar receiver according to claim 6, wherein the fourth calculating means includes a plurality of $(N'+1)$ circuits, each circuit of order k between 0 and N', comprising:

a first circuit for calculating the modulus $A_k$ of the signal $P^{(k)}$ delivered by the first calculating means;

a circuit for normalizing the modulus $A_k$ of the signal $P^{(k)}$;

a threshold circuit delivering a pulse signal (Y) whose level is "0" for the values of $A_k$ which are less than or equal to a positive threshold ($p_k$), and "1" for the values of $A_k$ which are greater than said threshold ($p_k$); and a multiplying circuit which receives the normalized modulus $A_k$ delivered by the normalizing circuit and the pulse signal (Y) delivered by the threshold circuit, and delivers the quality coefficient ($\beta_k$).

11. A radar receiver according to claim 6, wherein the fourth calculating means comprises a plurality of $(N'+1)$ sub-units, each sub-unit of order k from 0 to N' comprising:

a first calculating circuit for raising to the k-th power a time constant ($\tau_k$) and delivering an homogenizing coefficient ($\tau_k^k$) to an input of a second calculating circuit for multiplying the signal ($P^{(k)}$) delivered by the first calculating means and the homogenizing coefficient ($\tau_k^k$) from the first calculating circuit; and a third calculating circuit for raising to the n-th power, with n being higher than or equal to 2, the product $[\tau_k^k \cdot P^{(k)}]^n$ supplied by the second calculating circuit and delivering the quality coefficient $\beta_k = [\tau_k^k \cdot P^{(k)}]^n$ to the input of the fifth calculating means.

12. A radar receiver according to claim 6, wherein the fifth calculating means includes:

a plurality of $(N'+1)$ multiplying circuits each multiplying circuit of order k between O and N' receiving at a first input the quality coefficient ($\beta_k$) of order k delivered by the fourth calculating means and at a second input the derived angle-error measurement operator ($\epsilon_k$) of order k delivered by the third calculating means and delivering the product ($\beta_k \cdot \epsilon_k$) of its two input signals;

a first adding circuit which has $(N'+1)$ inputs fed respectively with the output signals ($\beta_k \cdot \epsilon_k$) from the $(N'+1)$ multiplying circuits and delivers a signal $$\sum_{k=0}^{N'} \beta_k \cdot \epsilon_k$$

equal to the algebraic sum of the input signals;

a second adding circuit which has $(N'+1)$ inputs fed respectively with the quality coefficients ($\beta_k$) calculated by the fourth calculating means and delivers a signal $$\sum_{k=0}^{N'} \beta_k$$

equal to the algebraic sum of the input signals; and a dividing circuit receiving at a first input the output signal $$\left( \sum_{k=0}^{N'} \beta_k \cdot \epsilon_k \right)$$

from the first adding circuit and at a second input the output signal $$\left( \sum_{k=0}^{N} \beta_k \right)$$

from the second adding circuit and delivering the combined angle-error measurement signal $\epsilon$ which is equal to the ratio of the first input signal to the second input signal.

* * * * *